United States Patent
Gan et al.

(10) Patent No.: US 10,558,099 B2
(45) Date of Patent: Feb. 11, 2020

(54) COUNTER SUBSTRATE, DISPLAY PANEL, AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Quan Gan, Beijing (CN); Yongcan Wang, Beijing (CN); Feng Yang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 170 days.

(21) Appl. No.: 15/758,169

(22) PCT Filed: Mar. 16, 2017

(86) PCT No.: PCT/CN2017/076870
§ 371 (c)(1),
(2) Date: Mar. 7, 2018

(87) PCT Pub. No.: WO2018/165931
PCT Pub. Date: Sep. 20, 2018

(65) Prior Publication Data
US 2019/0361304 A1    Nov. 28, 2019

(51) Int. Cl.
*H01L 27/14* (2006.01)
*G02F 1/1362* (2006.01)
(Continued)

(52) U.S. Cl.
CPC .... *G02F 1/136209* (2013.01); *G02F 1/13454* (2013.01); *G02F 1/133512* (2013.01);
(Continued)

(58) Field of Classification Search
CPC ............. G02F 1/1335; G02F 1/133555; G02F 1/136209; G02F 1/133512; G02F 1/133514
See application file for complete search history.

(56) References Cited

U.S. PATENT DOCUMENTS 9,960,194 B1 *   5/2018   Park .................... G02F 1/13452
2008/0100760 A1   5/2008   Lee et al.
(Continued)

FOREIGN PATENT DOCUMENTS

CN   101183198 A   5/2008
KR   100961944 B1  6/2010

OTHER PUBLICATIONS

International Search Report & Written Opinion dated Dec. 20, 2017, regarding PCT/CN2017/076870.

*Primary Examiner* — Phuc T Dang
(74) *Attorney, Agent, or Firm* — Intellectual Valley Law, P.C.

(57) ABSTRACT

The present application discloses a display panel having a plurality of gate lines and a plurality of data lines crossing over each other thereby defining an array of a plurality of subpixels along a first direction and a second direction in the display panel. The display panel includes a black matrix layer defining a plurality of subpixel areas corresponding to the plurality of subpixels; a plurality of pixel electrodes, each of which is in one of the plurality of subpixels and having an aperture region; and an auxiliary black matrix layer dividing the aperture region into at least two aperture sub-regions separated by the auxiliary black matrix layer.

18 Claims, 10 Drawing Sheets

(51) Int. Cl.
 *G02F 1/1335* (2006.01)
 *G02F 1/1345* (2006.01)
 *G02F 1/1368* (2006.01)

(52) U.S. Cl.
 CPC .. *G02F 1/133514* (2013.01); *G02F 1/136286* (2013.01); *G02F 1/1368* (2013.01)

(56) References Cited

U.S. PATENT DOCUMENTS

| | | |
|---|---|---|
| 2008/0129670 A1 | 6/2008 | Ma |
| 2011/0242465 A1* | 10/2011 | Lee ................... G02F 1/133308 349/110 |
| 2015/0116625 A1 | 4/2015 | Hwang et al. |
| 2016/0141353 A1 | 5/2016 | Kim et al. |
| 2017/0038640 A1* | 2/2017 | Wang ................ G02F 1/133555 |
| 2017/0192570 A1* | 7/2017 | Choi ................... G02F 1/13338 |
| 2017/0287418 A1* | 10/2017 | Hwang ................ G09G 3/3607 |
| 2017/0301314 A1* | 10/2017 | Kim ................... H01L 27/3218 |

* cited by examiner

FIG. 1

*Related Art*

COUNTER SUBSTRATE, DISPLAY PANEL, AND DISPLAY APPARATUS

CROSS-REFERENCE TO RELATED APPLICATION

This application is a national stage application under 35 U.S.C. § 371 of International Application No. PCT/CN2017/076870 filed Mar. 16, 2017, the contents of which are incorporated by reference in the entirety.

TECHNICAL FIELD

The present invention relates to display technology, more particularly, to a counter substrate, a display panel, and a display apparatus.

BACKGROUND

Image display apparatuses include a plurality of drivers for controlling image display in each of a plurality of subpixels. The driver is a transistor-based circuit, examples of which including a gate driving circuit and a data driving circuit. A gate driving circuit is primarily formed by cascading multiple units of shift register circuits. Each shift register unit outputs a gate driving signal to one of a plurality of gate lines of pixel transistors. The gate driving signals from the gate driving circuit scan through gate lines row by row, controlling each row of transistors to be in on/off states. The gate driving circuits may be formed directly on an array substrate, e.g., in a gate-on-array display panel.

In a dual gate display panel, two gate lines are disposed between adjacent rows of subpixels. Thus, in a dual gate display panel, the number of data driver chips can be reduced by half. In the dual gate display panel, the peripheral area can be made relatively smaller.

SUMMARY

In one aspect, the present invention provides a display panel having a plurality of gate lines and a plurality of data lines crossing over each other thereby defining an array of a plurality of subpixels along a first direction and a second direction in the display panel, comprising a black matrix layer defining a plurality of subpixel areas corresponding to the plurality of subpixels; a plurality of pixel electrodes, each of which in one of the plurality of subpixels and having an aperture region; and an auxiliary black matrix layer dividing the aperture region into at least two aperture sub-regions separated by the auxiliary black matrix layer.

Optionally, a resolution of an image displayed on the display panel is determined by a size of the at least two aperture sub-regions.

Optionally, the at least two aperture sub-regions have a substantially the same area.

Optionally, the auxiliary black matrix layer divides the aperture region into the at least two aperture sub-regions substantially along the first direction.

Optionally, the auxiliary black matrix layer divides the aperture region into the at least two aperture sub-regions substantially along the second direction.

Optionally, the auxiliary black matrix layer divides the aperture region into at least four aperture sub-regions in a form of an array along the first direction and the second direction.

Optionally, the black matrix layer and the auxiliary black matrix layer are in a same layer and made of a same material.

Optionally, the display panel further comprises a gate-on-array circuit configured to provide a plurality of gate scanning signals to the plurality of gate lines.

Optionally, the auxiliary black matrix layer divides the aperture region into the at least two aperture sub-regions substantially along the second direction; and the second direction is a direction along which the plurality of data lines extend.

Optionally, the display panel comprises two gate lines between adjacent rows of subpixels.

Optionally, the auxiliary black matrix layer divides the aperture region into the at least two aperture sub-regions substantially along the first direction; and the first direction is a direction along which the plurality of gate lines extend.

In another aspect, the present invention provides a display apparatus comprising the display panel described herein.

In another aspect, the present invention provides a counter substrate comprising a black matrix layer defining a plurality of subpixel areas; a color filter layer comprising a plurality of color filter blocks of a same color, each of the plurality of color filter blocks being in one of the plurality of subpixel areas and having an aperture region; and an auxiliary black matrix layer dividing the aperture region into at least two aperture sub-regions separated by the auxiliary black matrix layer.

Optionally, the at least two aperture sub-regions have a substantially the same area.

Optionally, the auxiliary black matrix layer divides the aperture region into the at least two aperture sub-regions substantially along a first direction.

Optionally, the auxiliary black matrix layer divides the aperture region into the at least two aperture sub-regions substantially along a second direction.

Optionally, the auxiliary black matrix layer divides the aperture region into at least four aperture sub-regions in a form of an array along a first direction and a second direction.

Optionally, the black matrix layer and the auxiliary black matrix layer are in a same layer and made of a same material.

In another aspect, the present invention provides an array substrate having a plurality of gate lines and a plurality of data lines crossing over each other thereby defining an array of a plurality of subpixel areas along a first direction and a second direction in the array substrate, comprising a plurality of pixel electrodes, each of which in one of the subpixel areas and having an aperture region; and an auxiliary black matrix layer dividing the aperture region into at least two aperture sub-regions separated by the auxiliary black matrix layer.

Optionally, the array substrate further comprises a black matrix layer, the black matrix layer and the auxiliary black matrix layer are in a same layer and made of a same material.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional liquid crystal display panels include a gate driving circuit to sequentially output a gate scanning signal to the gate lines and a data driving circuit to output a data signal to the data lines. The gate driving circuit and the data driving circuit may be provided in a chip and arranged on the liquid crystal display panel or on a film attached to the liquid crystal display panel (e.g., chip-on-film, chip-on-glass).

To reduce that number of the gate driving chips required on the display panel, the liquid crystal display panel may be designed to have a gate-on-array circuit, which is formed directly on the array substrate in a patterning process. The gate-on-array circuit include a shift register in which a plurality of stages are connected to each other one after another. It was discovered in the present disclosure that odd-numbered gate lines and even-numbered gate lines in a gate-on-array liquid crystal display panel may have different charging rates, causing a horizontal line defect ("H-line defect") in the display panel. The H-line defect is particularly problematic when the grayscale intensity is relatively low.

Figure 1:
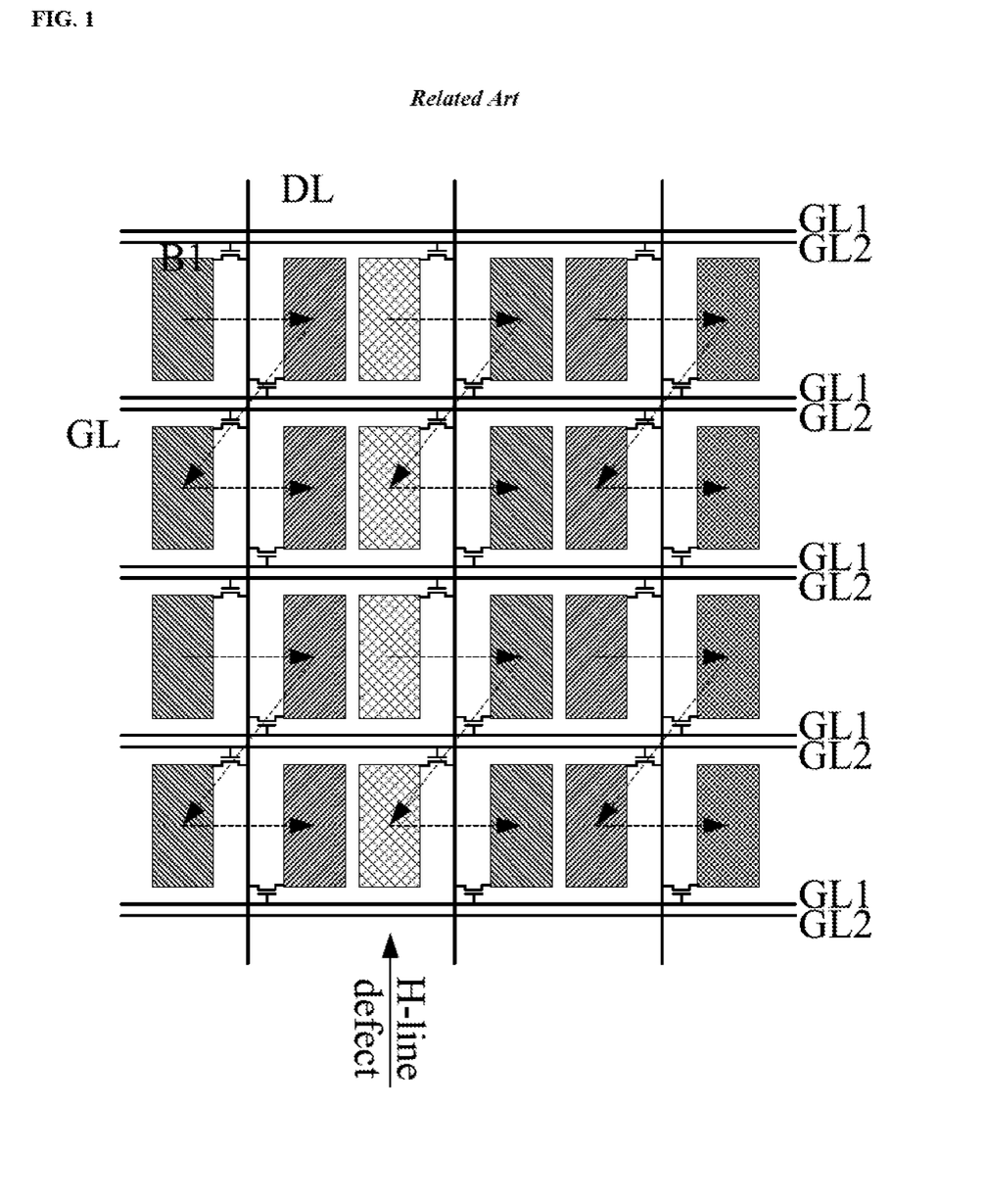
FIG. 1 is a schematic diagram illustrating the structure of a conventional dual gate liquid crystal display panel.

To reduce that number of the data driving chips required on the display panel, the liquid crystal display panel may be designed to have a dual gate configuration, in which the display panel has two gate lines between adjacent rows of subpixels. FIG. 1 is a schematic diagram illustrating the structure of a conventional dual gate liquid crystal display panel. Referring to FIG. 1, pixel electrodes in odd-numbered columns are charged by thin film transistors controlled by even-numbered gate lines GL2, and pixel electrodes in even-numbered columns are charged by thin film transistors controlled by odd-numbered gate lines GL1. It was discovered in the present disclosure that odd-numbered gate lines and even-numbered gate lines in the dual gate display panel may have different charging rates, resulting in a vertical line defect ("V-line defect") in the display panel. The V-line defect becomes particularly problematic when the grayscale intensity is relatively low.

In display panels having a relatively low pixel-per-inch (PPI), the V-line defect and the H-line defect are more severe, leading to a deteriorated display quality.

Accordingly, the present disclosure provides, inter alia, a counter substrate, an array substrate, a display panel, a display apparatus, and a fabricating method thereof that substantially obviate one or more of the problems due to limitations and disadvantages of the related art. In one aspect, the present disclosure provides a display panel having a plurality of gate lines and a plurality of data lines crossing over each other thereby defining an array of a plurality of subpixels along a first direction and a second direction in the display panel. In some embodiments, the display panel includes a black matrix layer defining a plurality of subpixel areas corresponding to the plurality of subpixels; a plurality of pixel electrodes, each of which in one of the plurality of subpixels and having an aperture region; and an auxiliary black matrix layer dividing the aperture region into at least two aperture sub-regions separated by the auxiliary black matrix layer. As used herein, the term "aperture region" refers to an effective region in each pixel electrode or each color filter block in a color filter layer, through which light can pass.

Figure 2:
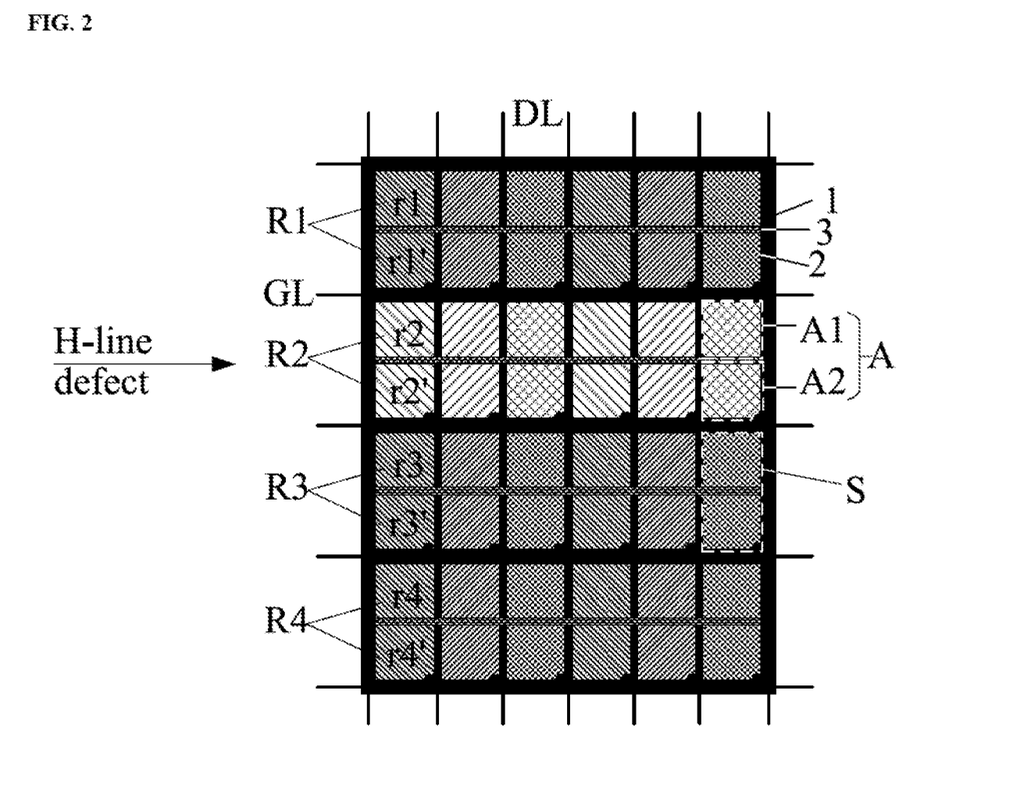
FIG. 2 is a schematic diagram illustrating the structure of a display panel in some embodiments according to the present disclosure.

FIG. 2 is a schematic diagram illustrating the structure of a display panel in some embodiments according to the present disclosure. Referring to FIG. 2, the display panel in some embodiments includes a plurality of gate lines GL and a plurality of data lines DL crossing over each other thereby defining an array of a plurality of subpixels along a first direction and a second direction in the display panel. The display panel includes a black matrix layer 1 defining a plurality of subpixel areas, and a plurality of pixel electrodes in the plurality of subpixels. Each subpixel area S corresponds to one of the plurality of subpixels. Each subpixel area S includes a single one of the plurality of pixel electrodes, and each of the plurality of pixel electrodes in each subpixel area S is an integral pixel electrode. Optionally, the integral pixel electrode is controlled by a single switching thin film transistor. Each pixel electrode 2 in a subpixel has an aperture region A. The present display panel further includes an auxiliary black matrix layer 3 dividing the aperture region A into at least two aperture sub-regions separated by the auxiliary black matrix layer 3. FIG. 2 shows a first aperture sub-region A1 and a second aperture sub-region A2.

In conventional display panels, the size of the subpixel determines the resolution of the image displayed on the display panel. In the present display panel, the display panel further includes an auxiliary black matrix layer 3 dividing each subpixel into at least two portions, e.g., each aperture region A of the pixel electrode is divided into at least two aperture sub-regions. The resolution of an image displayed on the display panel is determined by a size of each of the at least two aperture sub-regions. For example, when the size of each of the at least two aperture sub-regions is one half of that of the aperture region A, the resolution is enhanced substantially twice. In another example, when the size of each of the at least two aperture sub-regions is a quarter of that of the aperture region A, the resolution is enhanced substantially four times.

Figure 3:
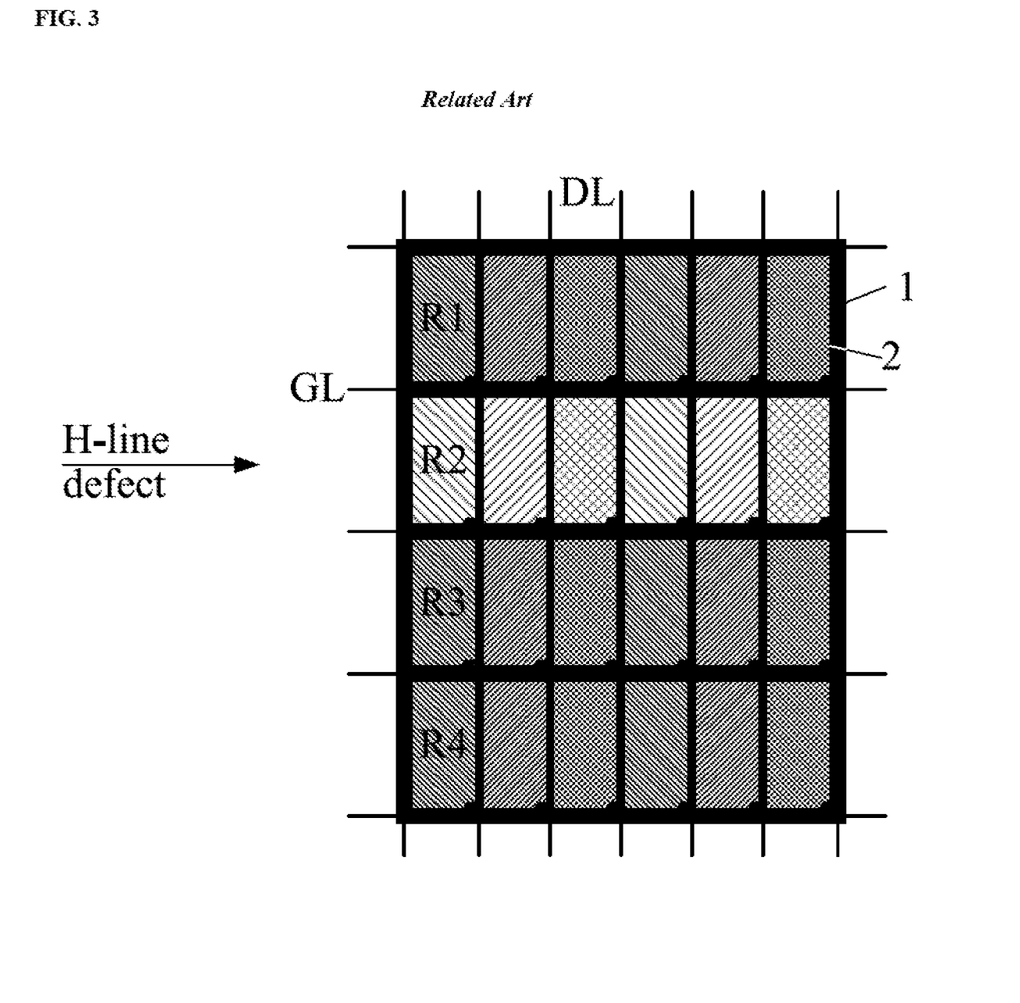
FIG. 3 is a schematic diagram illustrating the structure of a conventional display panel.

In some embodiments, the at least two aperture sub-regions of a same aperture region have a substantially the same area. Optionally, light passed through each of the at least two aperture sub-regions of a same aperture region is substantially the same when a data signal is applied to the subpixel having the at least two aperture sub-regions. In the present display panel, H-line defects can be substantially eliminated or much reduced. FIG. 3 is a schematic diagram illustrating the structure of a conventional display panel. Referring to FIG. 3, an H-line defect occurs in a row of subpixels. When applied with a same data signal, the grayscale intensity of a subpixel in the row of subpixels having the H-line defect is larger than that of a subpixel in a row of subpixels not having the H-line defect. For example, in FIG. 3, when applied with a same data signal, the grayscale intensity of the R2 subpixel is larger than that of the R1, R3, and R4 subpixels. Because the resolution of the image provided by the conventional display panel in FIG. 3 is lower than that can be distinguished by human eyes, the H-line defect can be detected, affecting the display quality. Referring to FIG. 2, each subpixel in the present display panel is divided into at least two portions by the auxiliary black matrix layer 3, the resolution of the displayed image is enhanced by at least twice. For example, the R1 subpixel is divided into a r1 portion and a r1' portion, the R2 subpixel is divided into a r2 portion and a r2' portion, the R3 subpixel is divided into a r3 portion and a r3' portion, and the R4 subpixel is divided into a r4 portion and a r4' portion. When each subpixel is applied with a same data signal, the sum of the grayscale intensities of two adjacent portions r1' and r2 is substantially the same as that of two adjacent portions r2' and r3. When perceived by human eyes, the H-line defect is eliminated or much reduced.

In some embodiments, the auxiliary black matrix layer 3 divides the aperture region A into the at least two aperture sub-regions successively arranged substantially along the second direction. For example, the auxiliary black matrix layer 3 extends substantially along the first direction, and divides the aperture region A into the at least two aperture sub-regions successively arranged substantially along the second direction. Optionally, the first direction is substantially parallel to a lateral direction of a subpixel, and the second direction is substantially parallel to a longitudinal direction of the subpixel. Optionally, the first direction is a direction along which the plurality of gate lines GL extend, and the second direction is a direction along which the plurality of data lines DL extend (as shown in FIG. 2). Optionally, the display panel further includes a gate-on-array circuit configured to provide a plurality of gate scanning signals to the plurality of gate lines GL, and the auxiliary black matrix layer 3 divides the aperture region A into the at least two aperture sub-regions successively arranged substantially in the direction along which the plurality of data lines DL extend.

Figure 4:
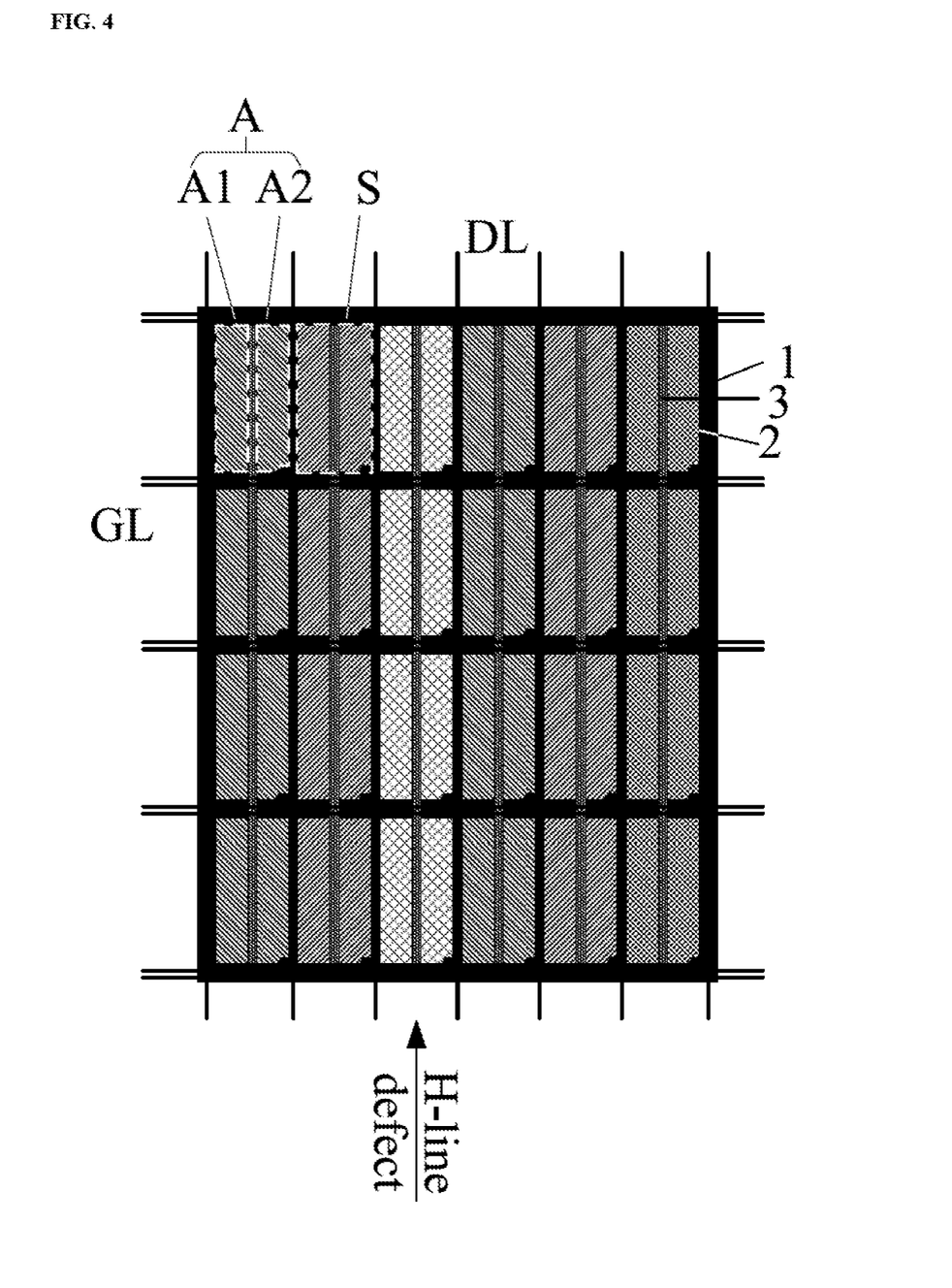
FIG. 4 is a schematic diagram illustrating the structure of a display panel in some embodiments according to the present disclosure.

In some embodiments, the auxiliary black matrix layer divides the aperture region into the at least two aperture sub-regions successively arranged substantially along the first direction. For example, the auxiliary black matrix layer 3 extends substantially along the second direction, and divides the aperture region A into the at least two aperture sub-regions successively arranged substantially along the first direction. Optionally, the first direction is substantially parallel to a lateral direction of a subpixel, and the second direction is substantially parallel to a longitudinal direction of the subpixel. FIG. 4 is a schematic diagram illustrating the structure of a display panel in some embodiments according to the present disclosure. Referring to FIG. 4, the display panel in some embodiments includes a plurality of gate lines GL and a plurality of data lines DL crossing over each other thereby defining an array of a plurality of subpixels along a first direction and a second direction in the display panel. The display panel includes a black matrix layer 1 defining a plurality of subpixel areas, and a plurality of pixel electrodes in the plurality of subpixels. Each subpixel area S corresponds to one of the plurality of subpixels. Each pixel electrode 2 in a subpixel has an aperture region A. The present display panel further includes an auxiliary black matrix layer 3 dividing the aperture region A into at least two aperture sub-regions separated by the auxiliary black matrix layer 3. The at least two aperture sub-regions are successively arranged substantially in a direction along which the plurality of gate lines GL extend. FIG. 4 shows a first aperture sub-region A1 and a second aperture sub-region A2. The auxiliary black matrix layer 3 extends substantially in the direction along which the plurality of data lines DL extend.

In some embodiments, the display panel is a dual gate display panel, e.g., the display panel includes two gate lines between adjacent rows of subpixels, and the auxiliary black matrix layer 3 divides the aperture region A into the at least two aperture sub-regions successively arranged substantially in a direction along which the plurality of gate lines GL extend (as shown in FIG. 4).

Figure 5:
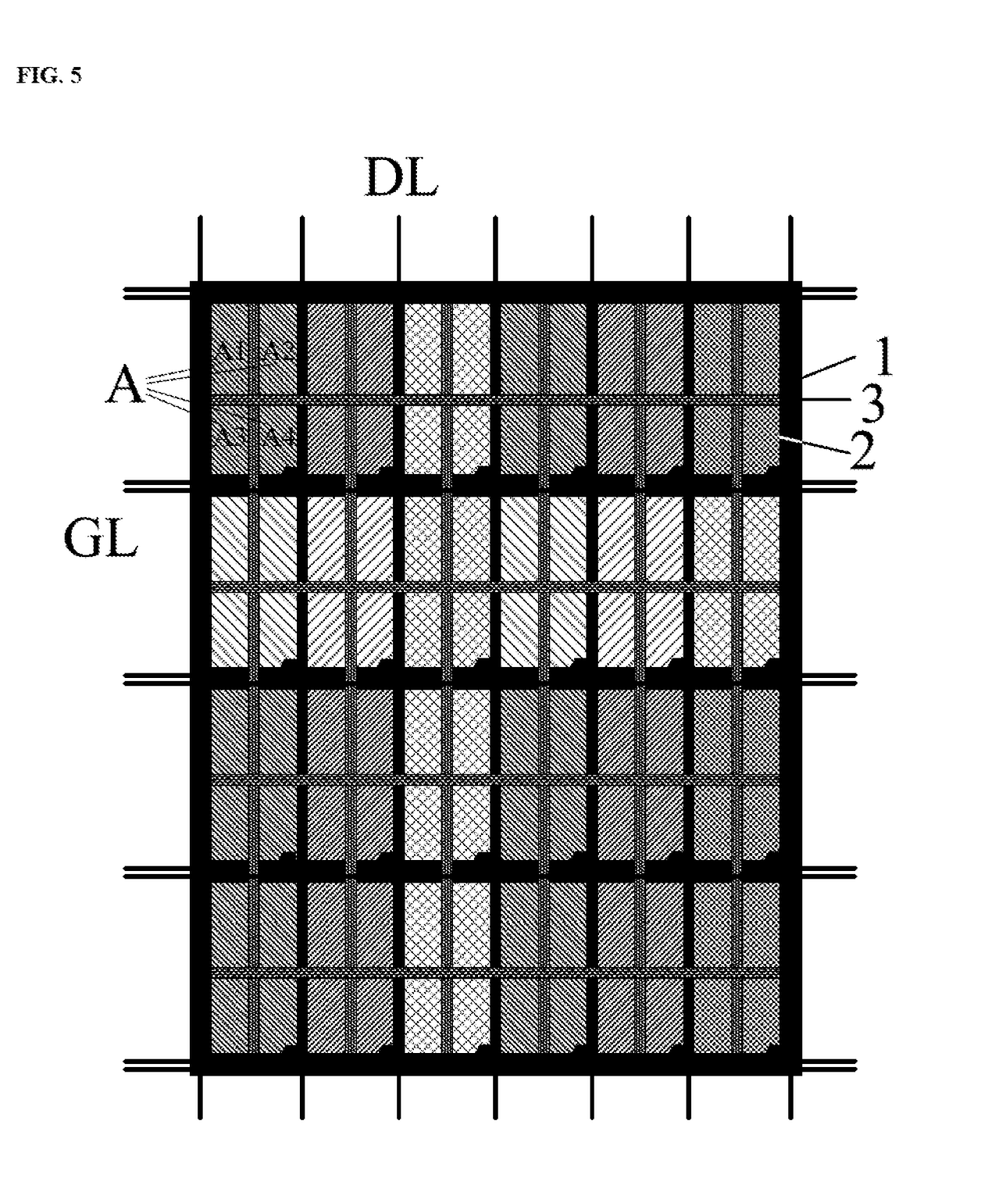
FIG. 5 is a schematic diagram illustrating the structure of a display panel in some embodiments according to the present disclosure.

In some embodiments, the auxiliary black matrix layer divides the aperture region A into at least four aperture sub-regions. The at least four aperture sub-regions are arranged as an array of aperture sub-regions along the first direction and the second direction. Optionally, the first direction is substantially parallel to a lateral direction of a subpixel, and the second direction is substantially parallel to a longitudinal direction of a subpixel. FIG. 5 is a schematic diagram illustrating the structure of a display panel in some embodiments according to the present disclosure. Referring to FIG. 5, the display panel in some embodiments includes a plurality of gate lines GL and a plurality of data lines DL crossing over each other thereby defining an array of a plurality of subpixels along a first direction and a second direction in the display panel. The present display panel includes an auxiliary black matrix layer 3 dividing an aperture region A into at least four aperture sub-regions separated by the auxiliary black matrix layer 3. FIG. 5 shows a first aperture sub-region A1, a second aperture sub-region A2, a third aperture sub-region A3, and a fourth aperture sub-region A4. The auxiliary black matrix layer 3 extends substantially in a first direction along which the plurality of gate lines GL extend and a second direction along which the plurality of data lines DL extend.

In some embodiments, the display panel is a dual gate, gate-on-array type display panel, e.g., the display panel includes a gate-on-array circuit configured to provide a plurality of gate scanning signals to the plurality of gate lines GL, and includes two gate lines between adjacent rows of subpixels. The auxiliary black matrix layer 3 divides the aperture region A into at least four aperture sub-regions separated by the auxiliary black matrix layer 3, the at least four aperture sub-regions arranged in a form of an array along the first direction and the second direction. The array includes a plurality of rows of aperture sub-regions successively arranged substantially in the direction along which the plurality of data lines DL extend, and a plurality of columns of aperture sub-regions successively arranged substantially in a direction along which the plurality of gate lines GL extend.

Figure 6:
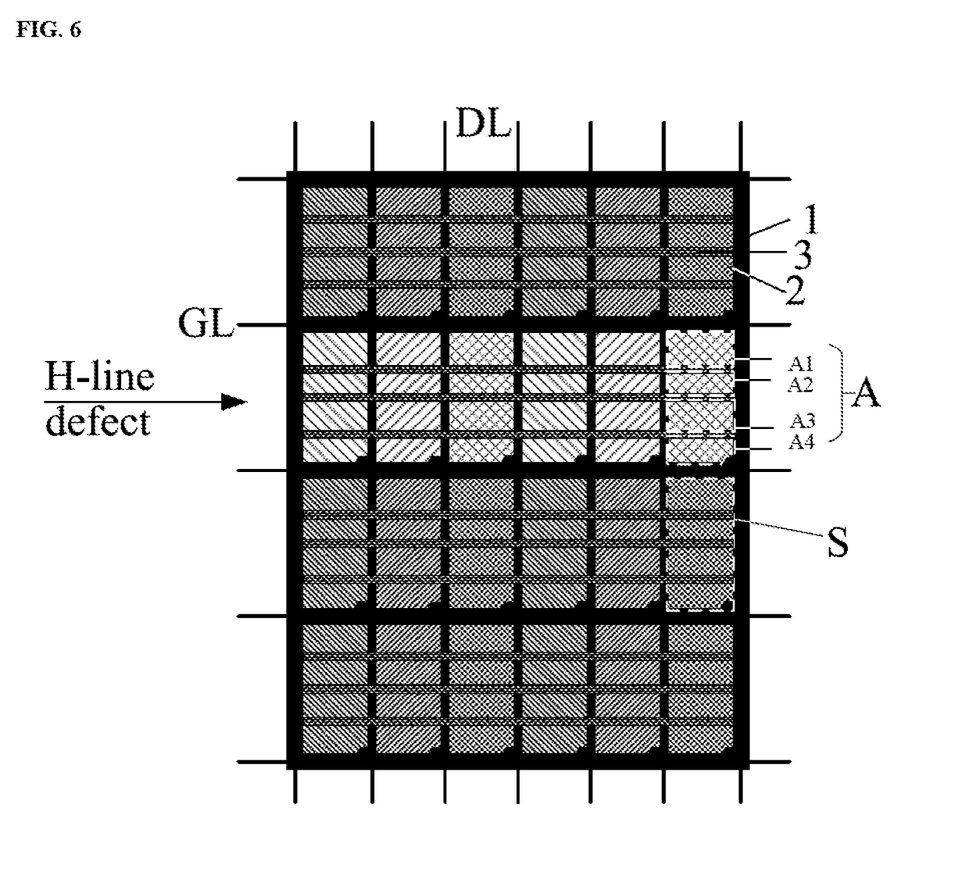
FIG. 6 is a schematic diagram illustrating the structure of a display panel in some embodiments according to the present disclosure.

In some embodiments, the auxiliary black matrix layer divides the aperture region A into more than two aperture sub-regions successively arranged substantially along the longitudinal direction of a subpixel. FIG. 6 is a schematic diagram illustrating the structure of a display panel in some embodiments according to the present disclosure. Referring to FIG. 6, the auxiliary black matrix layer 3 extends substantially along the first direction, and divides the aperture region A into four aperture sub-regions (A1, A2, A3, and A4) successively arranged substantially along the second direction. The first direction is substantially parallel to the lateral direction of the subpixel.

In some embodiments, the auxiliary black matrix layer divides the aperture region A into more than two aperture sub-regions successively arranged substantially along the lateral direction of a subpixel. Optionally, the lateral direction of the subpixel is substantially parallel to a direction along which the plurality of gate lines GL extend.

The auxiliary black matrix layer may be formed in various appropriate positions. In some embodiments, the auxiliary black matrix layer and the black matrix layer are in a same layer, e.g., patterned in a same process. In one example, the auxiliary black matrix layer and the black matrix layer are made of a same material. In another example, the auxiliary black matrix layer and the black matrix layer constitute an integrated layer. Optionally, the auxiliary black matrix layer and the black matrix layer are in a same layer in the counter substrate. Optionally, the auxiliary black matrix layer and the black matrix layer are in a same layer in the array substrate.

In some embodiments, the auxiliary black matrix layer and the black matrix layer constitute an integrated layer. The display panel includes a plurality of gate lines and a plurality of data lines crossing over each other thereby defining an array of a plurality of subpixels along a first direction and a second direction in the display panel. Optionally, the display panel includes a plurality of pixel electrodes, each of which in one of the plurality of subpixels and having an aperture region; and an integrated black matrix layer defining the plurality of subpixel areas corresponding to the plurality of subpixels, and dividing the aperture region into at least two aperture sub-regions separated by the integrated black matrix layer.

In some embodiments, the auxiliary black matrix layer and the black matrix layer are in different layers, e.g., patterned in different patterning processes. In one example, the auxiliary black matrix layer and the black matrix layer are made of a same material. In another example, the auxiliary black matrix layer and the black matrix layer are made of different black materials. Optionally, the auxiliary black matrix layer and the black matrix layer are in different layers in the counter substrate. Optionally, the auxiliary black matrix layer and the black matrix layer are in different layers in the array substrate. Optionally, the auxiliary black matrix layer is in the array substrate and the black matrix layer is in the counter substrate. Optionally, the auxiliary black matrix layer is in the counter substrate and the black matrix layer is in the array substrate.

Examples of appropriate materials for making the auxiliary black matrix layer include, but are not limited to, a black material such as a metal or metal oxide (e.g., chromium or chromium oxide), a pigment-containing resin, etc.

Examples of appropriate materials for making the black matrix layer include, but are not limited to, a black material such as a metal or metal oxide (e.g., chromium or chromium oxide), a pigment-containing resin, etc.

In another aspect, the present disclosure provides a counter substrate. In some embodiments, the counter substrate includes a black matrix layer defining a plurality of subpixel areas; a color filter layer having a plurality of color filter blocks of a same color; each of the plurality of color filter blocks being in one of the plurality of subpixel areas and having an aperture region; and an auxiliary black matrix layer dividing the aperture region into at least two aperture sub-regions separated by the auxiliary black matrix layer.

In some embodiments, the at least two aperture sub-regions of a same aperture region have a substantially the same area. Optionally, light passed through the at least two aperture sub-regions of a same aperture region is substantially the same when a data signal is applied to the subpixel having the at least two aperture sub-regions. Each subpixel in a display panel having the present counter substrate is divided into at least two portions by the auxiliary black matrix layer, the resolution of the displayed image is enhanced by at least twice. In the display panel having the present counter substrate, H-line defects can be substantially eliminated or reduced.

Figure 7:
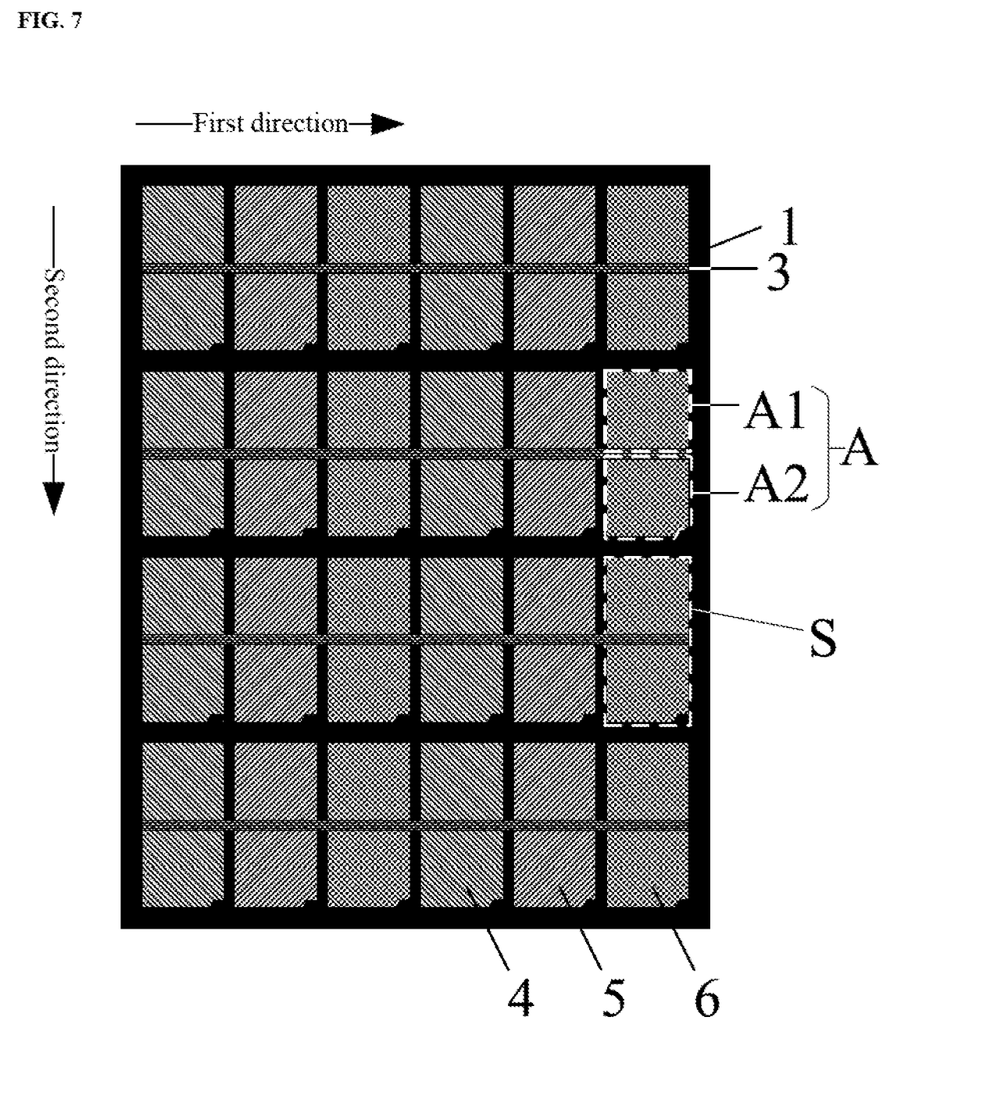
FIG. 7 is a schematic diagram illustrating the structure of a counter substrate in some embodiments according to the present disclosure.
Figure 8:
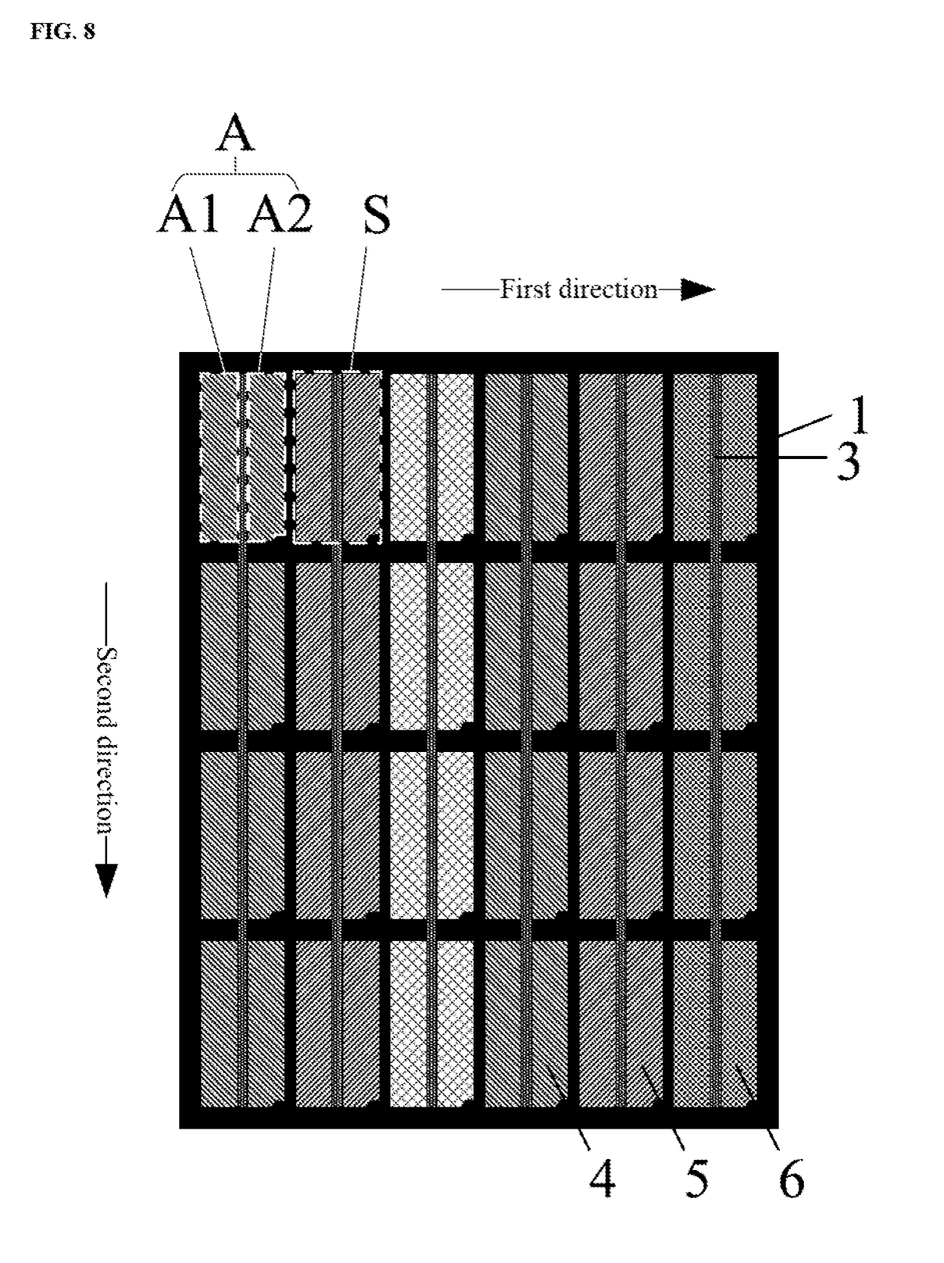
FIG. 8 is a schematic diagram illustrating the structure of a counter substrate in some embodiments according to the present disclosure.
Figure 9:
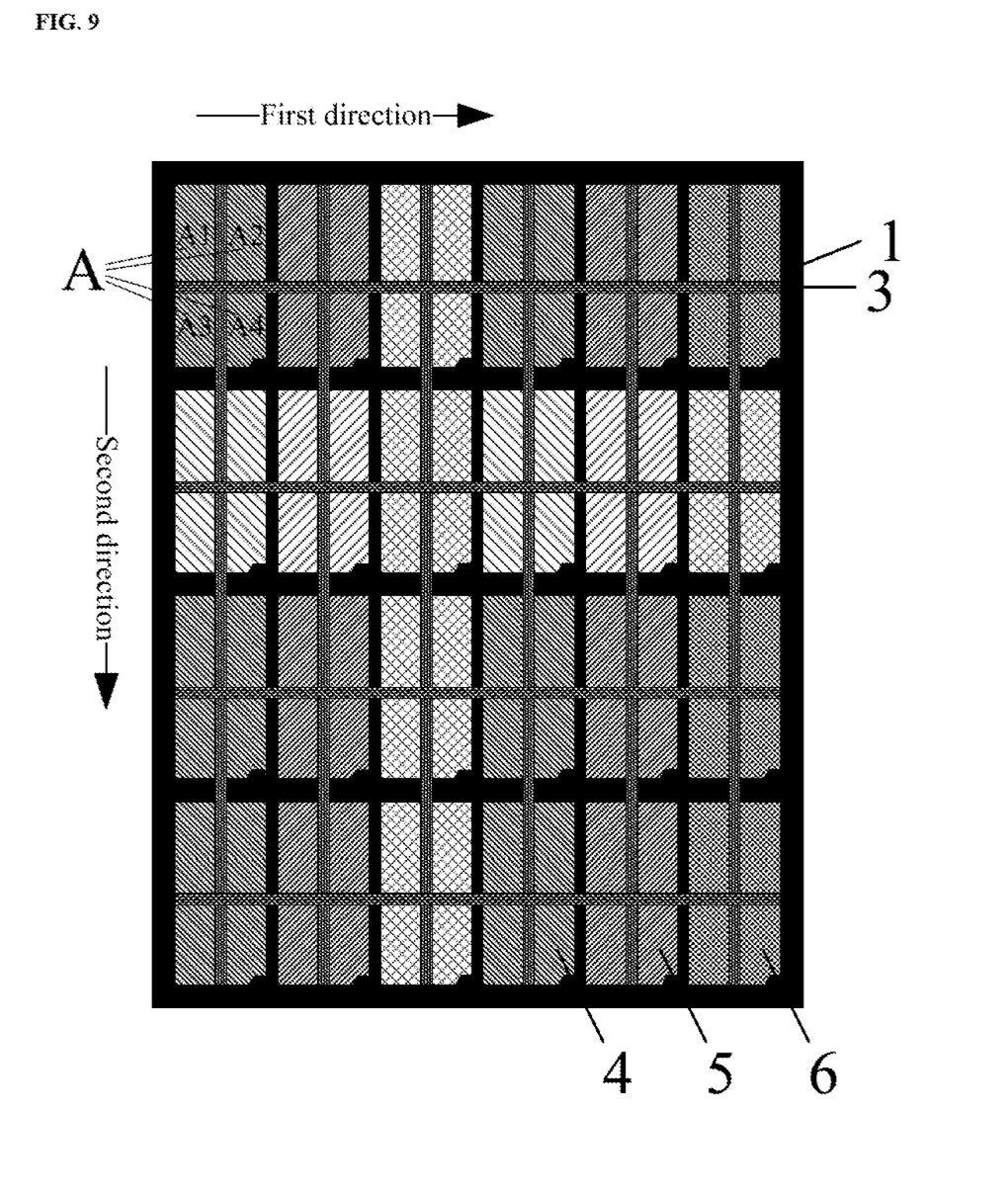
FIG. 9 is a schematic diagram illustrating the structure of a counter substrate in some embodiments according to the present disclosure.
Figure 10:
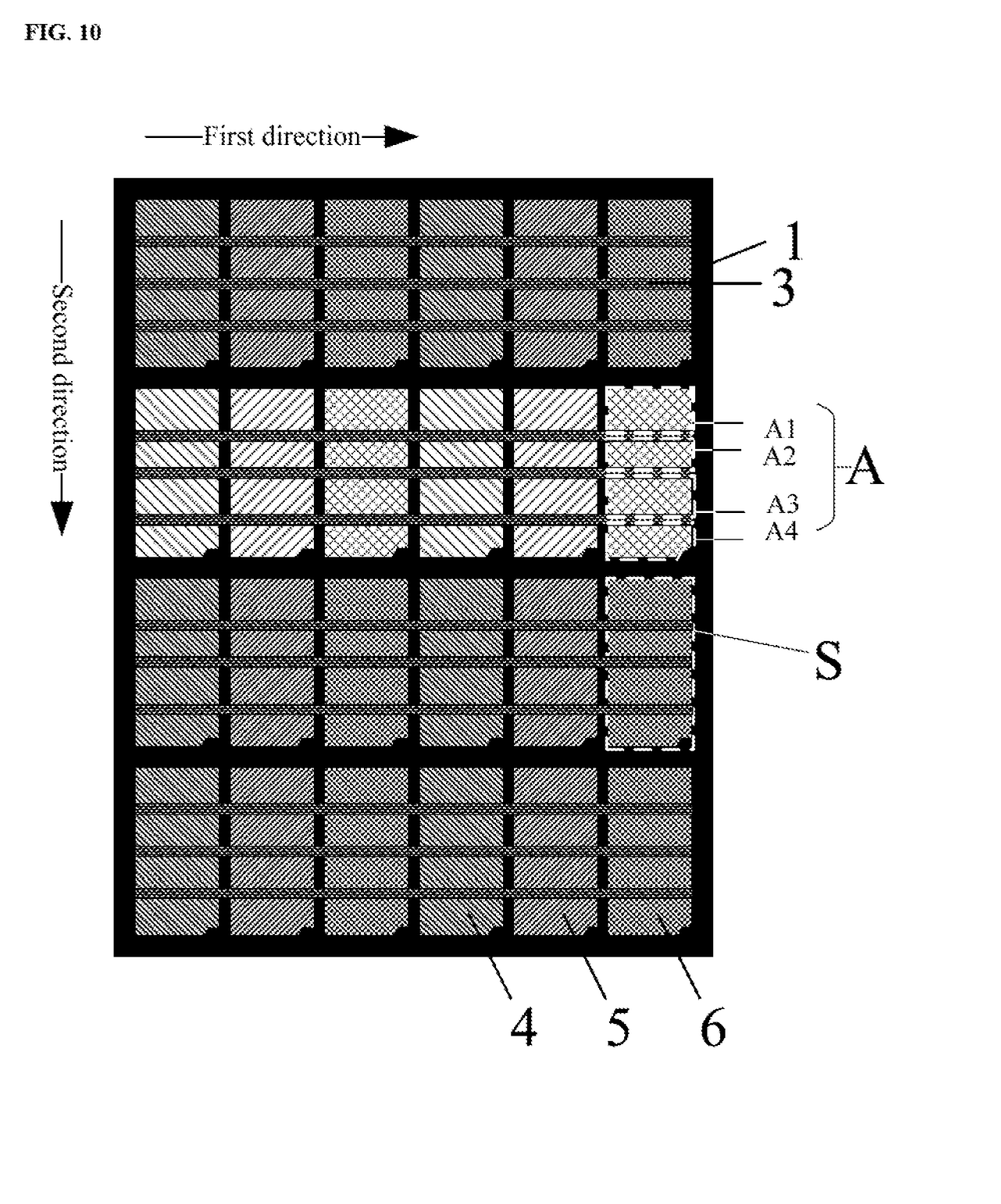
FIG. 10 is a schematic diagram illustrating the structure of a counter substrate in some embodiments according to the present disclosure.

FIGS. 7 to 10 are schematic diagrams illustrating the structures of counter substrates in some embodiments according to the present disclosure. Referring to FIGS. 7 to 10, the counter substrate in some embodiments includes a black matrix layer 1 defining a plurality of subpixel areas S; a first color filter layer 4 having a plurality of first color filter blocks of a first color, a second color filter layer 5 having a plurality of second color filter blocks of a second color, a third color filter layer 6 having a plurality of third color filter blocks of a third color; each of the plurality of first, second, and third color filter blocks being in one of the plurality of subpixel areas S and having an aperture region A; and an auxiliary black matrix layer 3 dividing the aperture region A into at least two aperture sub-regions (e.g., A1 and A2) separated by the auxiliary black matrix layer 3. Referring to FIG. 7, the auxiliary black matrix layer 3 extends substantially along a first direction, and divides the aperture region A into the at least two aperture sub-regions successively arranged substantially along a second direction. Optionally, the first direction is substantially parallel to a lateral direction of a subpixel area S, and the second direction is substantially parallel to a longitudinal direction of the subpixel area S. FIG. 7 shows a first aperture sub-region A1 and a second aperture sub-region A2. Referring to FIG. 8, the auxiliary black matrix layer 3 extends substantially along a second direction, and divides the aperture region A into the at least two aperture sub-regions successively arranged substantially along a first direction. Optionally, the first direction is substantially parallel to a lateral direction of a subpixel area S, and the second direction is substantially parallel to a longitudinal direction of the subpixel area S. FIG. 8 shows a first aperture sub-region A1 and a second aperture sub-region A2. Referring to FIG. 9, the auxiliary black matrix layer 3 divides aperture region A into at least four aperture sub-regions separated by the auxiliary black matrix layer 3. The auxiliary black matrix layer 3 extends substantially in a first direction and a second direction. FIG. 9 shows a first aperture sub-region A1, a second aperture sub-region A2, a third aperture sub-region A3, and a fourth aperture sub-region A4. The at least four aperture sub-regions are arranged as an array of aperture sub-regions along the first direction and the second direction. Optionally, the first direction is substantially parallel to a lateral direction of a subpixel area S, and the second direction is substantially parallel to a longitudinal direction of a subpixel area S. Referring to FIG. 10, the auxiliary black matrix layer 3 extends substantially along the first direction, and divides the aperture region A into more than two aperture sub-regions successively arranged substantially along the longitudinal direction of a subpixel area S. FIG. 10 shows four aperture sub-regions (A1, A2, A3, and A4) successively arranged substantially along the second direction. The first direction is substantially parallel to the lateral direction of the subpixel area S. In some embodiments, the auxiliary black matrix layer 3 divides the aperture region A into more than two aperture sub-regions successively arranged substantially along the lateral direction of a subpixel area S.

In some embodiments, the auxiliary black matrix layer and the black matrix layer are in a same layer, e.g., patterned in a same process. In one example, the auxiliary black matrix layer and the black matrix layer are made of a same material. In another example, the auxiliary black matrix layer and the black matrix layer constitute an integrated layer.

In some embodiments, the auxiliary black matrix layer and the black matrix layer constitute an integrated layer. The counter substrate includes a color filter layer having a plurality of color filter blocks of a same color, each of the plurality of color filter blocks being in one of the plurality of subpixel areas and having an aperture region; and an integrated black matrix layer defining the plurality of subpixel areas and dividing the aperture region into at least two aperture sub-regions separated by the integrated black matrix layer.

In some embodiments, the auxiliary black matrix layer and the black matrix layer are in different layers, e.g., patterned in different patterning processes. In one example, the auxiliary black matrix layer and the black matrix layer are made of a same material. In another example, the auxiliary black matrix layer and the black matrix layer are made of different black materials.

Examples of appropriate materials for making the auxiliary black matrix layer include, but are not limited to, a black material such as a metal or metal oxide (e.g., chromium or chromium oxide), a pigment-containing resin, etc.

Examples of appropriate materials for making the black matrix layer include, but are not limited to, a black material such as a metal or metal oxide (e.g., chromium or chromium oxide), a pigment-containing resin, etc.

In another aspect, the present disclosure provides a display panel having a plurality of gate lines and a plurality of data lines crossing over each other thereby defining an array of a plurality of subpixels along a first direction and a second direction in the display panel. In some embodiments, the display panel includes a black matrix layer defining a plurality of subpixel areas corresponding to the plurality of subpixels; a plurality of pixel electrodes, each of which being in one of the plurality of subpixels and having a first aperture region; and an auxiliary black matrix layer dividing the first aperture region into at least two aperture sub-regions separated by the auxiliary black matrix layer. In some embodiments, the display panel includes a counter substrate. Optionally, the black matrix layer and the auxiliary black matrix layer are in the counter substrate. Optionally, the counter substrate includes a color filter layer having a plurality of color filter blocks of a same color, each of the plurality of color filter blocks being in one of the plurality of subpixel areas and having a second aperture region corresponding to the first aperture region. The auxiliary black matrix layer divides the second aperture region into at least two aperture sub-regions separated by the auxiliary black matrix layer.

In some embodiments, each of the plurality of subpixel areas includes a single one of the plurality of pixel electrodes, and each of the plurality of pixel electrodes in each of the plurality of subpixel areas is an integral pixel electrode. Optionally, the integral pixel electrode is controlled by a single switching thin film transistor. Optionally, each of the plurality of color filter blocks of the same color corresponds to the single one of the plurality of pixel electrodes, e.g., each of the plurality of color filter blocks of the same color corresponds to the integral pixel electrode.

In another aspect, the present disclosure provides a method of fabricating a counter substrate. In some embodiments, the method includes forming a black matrix layer defining a plurality of subpixel areas; forming a color filter layer having a plurality of color filter blocks of a same color, each of the plurality of color filter blocks being in one of the plurality of subpixel areas and having an aperture region; and forming an auxiliary black matrix layer dividing the aperture region into at least two aperture sub-regions separated by the auxiliary black matrix layer. Optionally, forming the black matrix layer and forming the auxiliary black matrix layer are performed in a single patterning process and using a same black material. Optionally, the at least two aperture sub-regions are formed to have a substantially the same area. Optionally, the auxiliary black matrix layer is formed to divide the aperture region into the at least two aperture sub-regions substantially along the first direction. Optionally, the auxiliary black matrix layer is formed to divide the aperture region into the at least two aperture sub-regions substantially along the second direction. Optionally, the auxiliary black matrix layer is formed to divide the aperture region into at least four aperture sub-regions in a form of an array along the first direction and the second direction.

In another aspect, the present disclosure provides a method of fabricating a display panel. In some embodiments, the method includes forming a counter substrate according to a method described herein, providing an array substrate, and assembling the counter substrate and the array substrate into a cell.

In some display panels, one or both of the auxiliary black matrix layer and the black matrix layer may be provided in the array substrate. Accordingly, in another aspect, the present disclosure provides an array substrate having a plurality of gate lines and a plurality of data lines crossing over each other thereby defining an array of a plurality of subpixel areas along a first direction and a second direction in the array substrate. In some embodiments, the array substrate includes a plurality of pixel electrodes, each of which in one of the plurality of subpixel areas and having an aperture region; and an auxiliary black matrix layer dividing the aperture region into at least two aperture sub-regions separated by the auxiliary black matrix layer. Optionally, the at least two aperture sub-regions of a same aperture region have a substantially the same area. Optionally, light passed through the at least two aperture sub-regions of a same aperture region is substantially the same when a data signal is applied to the subpixel having the at least two aperture sub-regions.

In some embodiments, the auxiliary black matrix layer divides the aperture region into the at least two aperture sub-regions successively arranged substantially along the second direction. For example, the auxiliary black matrix layer extends substantially along the first direction, and divides the aperture region into the at least two aperture sub-regions successively arranged substantially along the second direction. Optionally, the first direction is substantially parallel to a lateral direction of a subpixel area, and the second direction is substantially parallel to a longitudinal direction of the subpixel area. Optionally, the first direction is a direction along which the plurality of gate lines extend, and the second direction is a direction along which the plurality of data lines extend. Optionally, the array substrate further includes a gate-on-array circuit configured to provide a plurality of gate scanning signals to the plurality of gate lines, and the auxiliary black matrix layer divides the aperture region into the at least two aperture sub-regions successively arranged substantially in the direction along which the plurality of data lines extend.

In some embodiments, the auxiliary black matrix layer divides the aperture region into the at least two aperture sub-regions successively arranged substantially along the first direction. For example, the auxiliary black matrix layer extends substantially along the second direction, and divides the aperture region into the at least two aperture sub-regions successively arranged substantially along the first direction. Optionally, the first direction is substantially parallel to a lateral direction of a subpixel area, and the second direction is substantially parallel to a longitudinal direction of the subpixel area. Optionally, the at least two aperture sub-regions are successively arranged substantially in a direction along which the plurality of gate lines extend. Optionally, the auxiliary black matrix layer extends substantially in the direction along which the plurality of data lines extend.

In some embodiments, the array substrate is a dual gate array substrate, e.g., the array substrate includes two gate lines between adjacent rows of subpixel areas, and the auxiliary black matrix layer divides the aperture region into the at least two aperture sub-regions successively arranged substantially in a direction along which the plurality of gate lines extend.

In some embodiments, the auxiliary black matrix layer divides the aperture region into at least four aperture sub-regions. The at least four aperture sub-regions are arranged as an array of aperture sub-regions along the first direction and the second direction. Optionally, the first direction is substantially parallel to a lateral direction of a subpixel area, and the second direction is substantially parallel to a longitudinal direction of a subpixel area. Optionally, the auxiliary black matrix extends substantially in a first direction along which the plurality of gate lines extend and a second direction along which the plurality of data lines extend.

In some embodiments, the array substrate is a dual gate, gate-on-array type array substrate, e.g., the array substrate includes a gate-on-array circuit configured to provide a plurality of gate scanning signals to the plurality of gate lines, and includes two gate lines between adjacent rows of subpixel areas. The auxiliary black matrix layer divides the aperture region into at least four aperture sub-regions separated by the auxiliary black matrix, the at least four aperture sub-regions arranged in a form of an array along the first direction and the second direction. The array of aperture sub-regions includes a plurality of rows of aperture sub-regions successively arranged substantially in the direction along which the plurality of data lines extend, and a plurality of columns of aperture sub-regions successively arranged substantially in a direction along which the plurality of gate lines extend.

In some embodiments, the auxiliary black matrix layer divides the aperture region into more than two aperture sub-regions successively arranged substantially along the longitudinal direction of a subpixel area. Optionally, the first direction is substantially parallel to the lateral direction of the subpixel area.

In some embodiments, the auxiliary black matrix layer divides the aperture region into more than two aperture sub-regions successively arranged substantially along the lateral direction of a subpixel area. Optionally, the lateral direction of the subpixel area is substantially parallel to a direction along which the plurality of gate lines extend.

In some embodiments, the array substrate further includes a black matrix layer defining a plurality of subpixel areas. In some embodiments, the auxiliary black matrix layer and the black matrix layer are in a same layer, e.g., patterned in a same process. In one example, the auxiliary black matrix layer and the black matrix layer are made of a same material. In another example, the auxiliary black matrix layer and the black matrix layer constitute an integrated layer.

In some embodiments, the auxiliary black matrix layer and the black matrix layer constitute an integrated layer. The array substrate includes a plurality of gate lines and a plurality of data lines crossing over each other thereby defining an array of a plurality of subpixel areas along a first direction and a second direction in the array substrate. Optionally, the array substrate includes a plurality of pixel electrodes, each of which in one of the plurality of subpixel areas and having an aperture region; and an integrated black matrix layer defining the plurality of subpixel areas, and dividing the aperture region into at least two aperture sub-regions separated by the integrated black matrix layer.

In some embodiments, the auxiliary black matrix layer and the black matrix layer are in different layers, e.g., patterned in different patterning processes. In one example, the auxiliary black matrix layer and the black matrix layer are made of a same material. In another example, the auxiliary black matrix layer and the black matrix layer are made of different black materials.

In another aspect, the present disclosure provides a method of fabricating an array substrate. In some embodiments, the method includes forming a plurality of pixel electrodes, each of which in one of the plurality of subpixel areas and having an aperture region; and forming an auxiliary black matrix layer dividing the aperture region into at least two aperture sub-regions separated by the auxiliary black matrix layer. Optionally, the at least two aperture sub-regions are formed to have a substantially the same area. Optionally, the auxiliary black matrix layer is formed to divide the aperture region into the at least two aperture sub-regions substantially along the first direction. Optionally, the auxiliary black matrix layer is formed to divide the aperture region into the at least two aperture sub-regions substantially along the second direction. Optionally, the auxiliary black matrix layer is formed to divide the aperture region into at least four aperture sub-regions in a form of an array along the first direction and the second direction. Optionally, the method further includes forming a gate-on-array circuit on the array substrate configured to provide a plurality of gate scanning signals to the plurality of gate lines. Optionally, the auxiliary black matrix layer is formed to divide the aperture region into the at least two aperture sub-regions substantially along the second direction; and the second direction is a direction along which the plurality of data lines extend. Optionally, the method includes forming two gate lines between adjacent rows of subpixel areas. Optionally, the auxiliary black matrix layer is formed to divide the aperture region into the at least two aperture sub-regions substantially along the first direction; and the first direction is a direction along which the plurality of gate lines extend.

In another aspect, the present disclosure provides a method of fabricating a display panel. In some embodiments, the method includes forming an array substrate according to a method described herein, providing a counter substrate, and assembling the counter substrate and the array substrate into a cell.

In another aspect, the present disclosure provides a method of fabricating a display panel. In some embodiments, the method includes forming a plurality of gate lines and a plurality of data lines crossing over each other thereby defining an array of a plurality of subpixels along a first direction and a second direction on a base substrate; forming a black matrix layer defining a plurality of subpixel areas corresponding to the plurality of subpixels; forming a plurality of pixel electrodes, each of which in one of the plurality of subpixels and having an aperture region; and forming an auxiliary black matrix layer dividing the aperture region into at least two aperture sub-regions separated by the auxiliary black matrix layer. Optionally, the step of forming the black matrix layer and the step of forming the auxiliary black matrix layer are performed in a single patterning process and using a same black material. Optionally, the at least two aperture sub-regions are formed to have a substantially the same area. Optionally, the auxiliary black matrix layer is formed to divide the aperture region into the at least two aperture sub-regions substantially along the first direction. Optionally, the auxiliary black matrix layer is formed to divide the aperture region into the at least two aperture sub-regions substantially along the second direction. Optionally, the auxiliary black matrix layer is formed to divide the aperture region into at least four aperture sub-regions in a form of an array along the first direction and the second direction. Optionally, the method further includes forming a gate-on-array circuit on the base substrate configured to provide a plurality of gate scanning signals to the plurality of gate lines. Optionally, the auxiliary black matrix layer is formed to divide the aperture region into the at least two aperture sub-regions substantially along the second direction; and the second direction is a direction along which the plurality of data lines extend. Optionally, the method includes forming two gate lines between adjacent rows of subpixels. Optionally, the auxiliary black matrix layer is formed to divide the aperture region into the at least two aperture sub-regions substantially along the first direction; and the first direction is a direction along which the plurality of gate lines extend.

In another aspect, the present disclosure provides a display panel having a counter substrate described herein or fabricated by a method described herein.

In another aspect, the present disclosure provides a display apparatus having a display panel described herein or fabricated by a method described herein. Examples of display apparatuses include, but are not limited to, an electronic paper, a mobile phone, a tablet computer, a television, a notebook computer, a monitor, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having a plurality of gate lines and a plurality of data lines crossing over each other thereby defining an array of a plurality of subpixels along a first direction and a second direction in the display panel, comprising:
   a black matrix layer defining a plurality of subpixel areas corresponding to the plurality of subpixels;
   a plurality of pixel electrodes, each of which in one of the plurality of subpixels and having an aperture region;
   a gate-on-array circuit configured to provide a plurality of gate scanning signals to the plurality of gate lines; and
   an auxiliary black matrix layer dividing the aperture region into at least two aperture sub-regions separated by the auxiliary black matrix layer.

2. The display panel of claim 1, wherein a resolution of an image displayed on the display panel is determined by a size of the at least two aperture sub-regions.

3. The display panel of claim 1, wherein the at least two aperture sub-regions have a substantially the same area.

4. The display panel of claim 1, wherein the auxiliary black matrix layer divides the aperture region into the at least two aperture sub-regions substantially along the first direction.

5. The display panel of claim 1, wherein the auxiliary black matrix layer divides the aperture region into the at least two aperture sub-regions substantially along the second direction.

6. The display panel of claim 1, wherein the auxiliary black matrix layer divides the aperture region into at least four aperture sub-regions in a form of an array along the first direction and the second direction.

7. The display panel of claim 1, wherein the black matrix layer and the auxiliary black matrix layer are in a same layer and made of a same material.

8. The display panel of claim 1, wherein the auxiliary black matrix layer divides the aperture region into the at least two aperture sub-regions substantially along the second direction; and
   the second direction is a direction along which the plurality of data lines extend.

9. The display panel of claim 1, wherein the display panel comprises two gate lines between adjacent rows of subpixels.

10. The display panel of claim 9, wherein the auxiliary black matrix layer divides the aperture region into the at least two aperture sub-regions substantially along the first direction; and
    the first direction is a direction along which the plurality of gate lines extend.

11. A display apparatus, comprising the display panel of claim 1.

12. A counter substrate, comprising:
    a black matrix layer defining a plurality of subpixel areas;

a color filter layer comprising a plurality of color filter blocks of a same color, each of the plurality of color filter blocks being in one of the plurality of subpixel areas and having an aperture region; and an auxiliary black matrix layer dividing the aperture region into at least two aperture sub-regions separated by the auxiliary black matrix layer.

13. The counter substrate of claim 12, wherein the at least two aperture sub-regions have a substantially the same area.

14. The counter substrate of claim 12, wherein the auxiliary black matrix layer divides the aperture region into the at least two aperture sub-regions substantially along a first direction.

15. The counter substrate of claim 12, wherein the auxiliary black matrix layer divides the aperture region into the at least two aperture sub-regions substantially along a second direction.

16. The counter substrate of claim 12, wherein the auxiliary black matrix layer divides the aperture region into at least four aperture sub-regions in a form of an array along a first direction and a second direction.

17. The counter substrate of claim 12, wherein the black matrix layer and the auxiliary black matrix layer are in a same layer and made of a same material.

18. An array substrate having a plurality of gate lines and a plurality of data lines crossing over each other thereby defining an array of a plurality of subpixel areas along a first direction and a second direction in the array substrate, comprising:

a plurality of pixel electrodes, each of which in one of the plurality of subpixel areas and having an aperture region;

an auxiliary black matrix layer dividing the aperture region into at least two aperture sub-regions separated by the auxiliary black matrix layer; and a black matrix layer, the black matrix layer and the auxiliary black matrix layer are in a same layer and made of a same material.

* * * * *